Sept. 6, 1932.  E. V. TAYLOR  1,876,177

BRAKE

Filed July 26, 1930

INVENTOR.
EUGENE V. TAYLOR
BY
*M. W. McConkey*
ATTORNEY

Patented Sept. 6, 1932

1,876,177

UNITED STATES PATENT OFFICE

EUGENE V. TAYLOR, OF CHICAGO, ILLINOIS, ASSIGNOR TO BENDIX BRAKE COMPANY, OF SOUTH BEND, INDIANA, A CORPORATION OF ILLINOIS

BRAKE

Application filed July 26, 1930. Serial No. 470,798.

This invention relates to brakes and is illustrated as embodied in an internal expanding vehicle brake.

An object of the invention is to provide a brake applying means such as a double arm lever that will take the braking reaction in the line of its pivotal center. This is accomplished in the embodiment shown by constructing the friction means such as a brake band with cam shaped ends, one of which has an arcuate portion with a center curvature at the lever axis.

Figure 1:
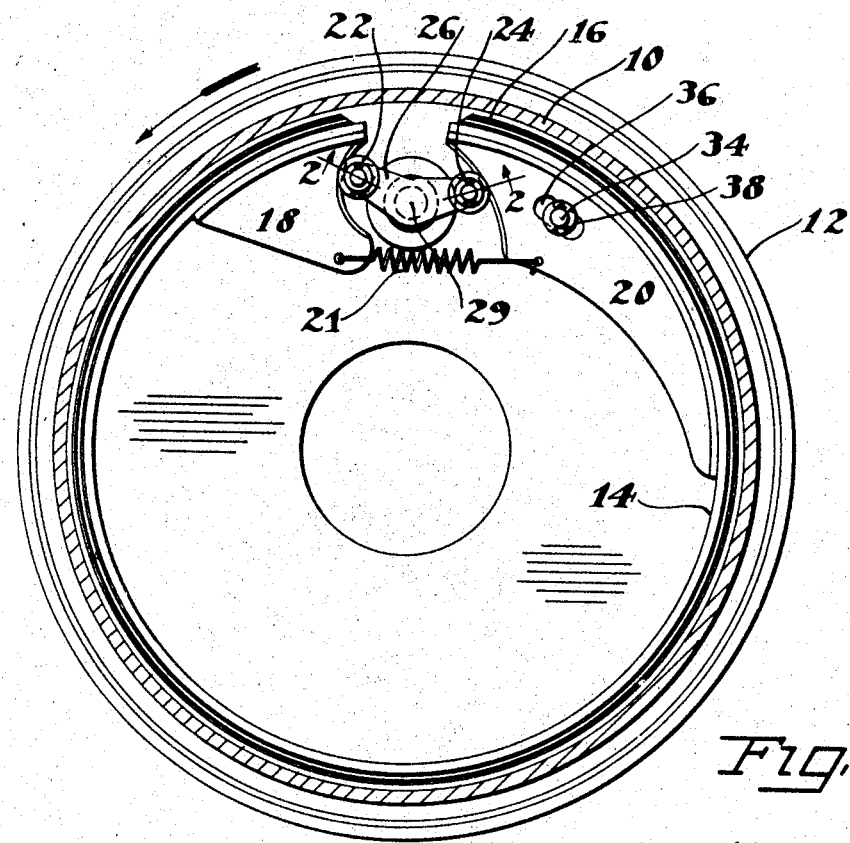
Figure 2:
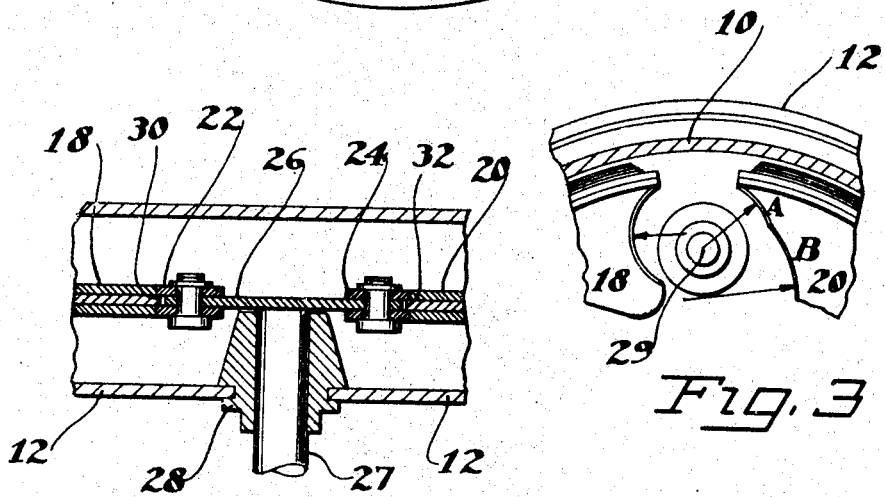
Figure 3:
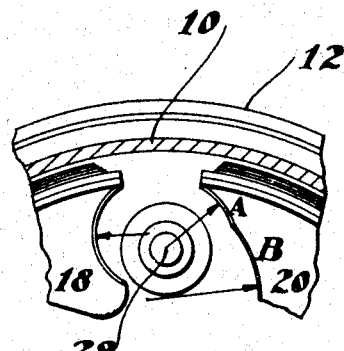

Other features of novelty relate to the two armed lever used to expand the ends of the brake band and to other novel combinations of parts and desirable constructions which will be apparent from the following description of one illustrative embodiment shown in the accompanying drawing, in which:

Figure 1 is a vertical section of a brake just inside the head of the brake drum showing the brake band in side elevation, Figure 2 is a sectional view taken on line 2—2 of Figure 1, showing the lever mounting, and Figure 3 is a fragmentary view illustrating the curvature of the brake band ends, the lever arm being omitted.

The illustrated brake includes a rotatable drum 10 at the open side of which is a backing plate 12 and within which is arranged a friction means such as the brake band 14 having a friction lining 16. The band 14 is provided with end brackets 18 and 20 to which is secured the retracting spring 21 for urging the band to the idle position and which have cam surfaces contacting with rollers 22 and 24, pivotally mounted on the opposite ends of the double arm lever 26, having a shaft 27 that is rotatably mounted in bearing 28 secured to the backing plate 12. Rollers 22 and 24 are formed of two circular discs on opposite sides of the lever 26 and project slightly beyond the ends of the lever to form a groove within which ride extensions 30 and 32 on the ends of brackets 18 and 20 respectively for guiding the band 14 within the drum.

Additional guiding means may be provided, such as a stud 34 which projects through a slot 36 in bracket 20 and upon which is mounted a washer 38 for holding the shoe against lateral movement. The cam surfaces on the brackets 18 and 20 are formed with different curvature as may be seen by referring to Figure 3 as will hereinafter be more specifically described.

In the illustrated embodiment the drum shown in Figure 1 rotates in the direction of arrow for forward movement of the vehicle. In this direction of movement, the portion of band 14 adjacent bracket 18 becomes the servo end of the band and transmits its braking force to the opposite end of the band where the reaction will be taken by the double arm lever 26 through roller 24. Bracket 18 is preferably the applying end of the band and has an arcuate end portion in contact with roller 22 with a center of curvature slightly above the axis 29 of lever 26 so that counterclockwise rotation of the lever will force the band against the brake drum 10.

The opposite end from the band is preferably formed with two distinct curves illustrated in Figure 3 as A and B. The portion B has a center of curvature somewhat below the axis of lever 26 and is intended to give a quick action for taking up the clearance between the band and drum to the point where the friction becomes noticeable. Beyond this point the curvature changes to one having a center of curvature at the axis 29 of lever 26 and during the movement of roller 24 along the portion A there will be no tendency for the roller to expand this end of the band and the lever arm terminating in roller 24 will merely act as a thrust member to receive the braking force that was initially started by roller 22, but which was built up by the servo action of the applying end of the brake and transmitted to the end of the band to which the bracket 20 is attached. The tangent point of the curve A with the roller 24 is in line with the axes of both roller 24 and lever 26 and the braking force will be transmitted to the lever 26 with no tendency to rotate the same.

It may be readily understood from the above description that I have illustrated a brake which is initially operated by both arms of a double arm lever up to the point where the clearance between the brake band and drum is taken up, and from there on the force of the lever is only transmitted to one end of the band, the other end being in contact with a lever arm which serves only as an anchor to receive the braking force in line with the axis of the lever.

While I have illustrated and described one embodiment of the invention, it is understood that the form shown is illustrative only and that I do not desire that the invention be limited to the illustrative embodiment or otherwise than by the terms of the appended claims.

I claim:

1. A brake comprising a drum, friction means therefor having relatively movable ends, a rotatable brake applying member, one of said ends having thrust surfaces, one of which is a cam surface adapted to coact with the member to apply the brake, and the other of which is a surface in contact with the member having the same contour as the path defined by the contacting portion of the member.

2. A brake comprising a drum, a floating brake shoe therein having separable ends, a rotatable brake applying member arranged to move both of said ends in applying the brake, said ends having thrust surfaces, one of which is a cam surface adapted to coact with the member to apply the brake, and the other of which has a surface in contact with the member having the same contour as the path defined by the contacting portion of the member.

3. A brake comprising a drum, friction means therein having adjacent thrust surfaces, a rotatable member contacting said surfaces, said surfaces being concave with respect to the axis of the member and having different curvature radii.

4. A brake comprising a drum, a friction band therein having adjacent thrust surfaces, a rotatable brake applying member between said surfaces, one of said surfaces having a center of curvature spaced from the member axis and the other surface having a center of curvature at the member axis.

5. A brake comprising, a support, a drum, a friction band therein having separable ends, a double arm lever journaled in the support and contacting with said ends, one of said lever arms coacting with the band to move the same when the lever is rotated, and the other arm first moving and then having an idle contact with the other end and adapted to take the braking force of the band.

6. A brake comprising, a support, a drum, a friction band therein having separable ends, a double arm lever journaled in the support having a roller on each arm, said ends having inclined cam surfaces engaging said rollers, and one of said surfaces having contact with said roller in a line intersecting the lever and roller axes for a substantial rotary movement of the lever.

7. A brake comprising, a drum, friction means therein having separable ends with thrust portions of unlike contour, and a rotary applying device contacting the thrust portions.

8. A brake comprising a drum, friction means therein having separable ends, one of which has a thrust portion acting as a cam, the other end having a thrust portion having a contour defined by a plurality of contiguous relatively eccentric arcs, and applying means engaging the thrust portions.

9. A brake comprising a drum, friction means therein having separable ends, one of which has a thrust portion acting as a cam, the other end having a thrust portion having a contour defined by a plurality of contiguous relatively eccentric arcs, and rotary applying means engaging the thrust portions, one of said arcs having its center coincident with the applying means axis.

In testimony whereof, I have hereunto signed my same.

EUGENE V. TAYLOR.